UNITED STATES PATENT OFFICE.

KARL SCHWICKERATH, OF DETROIT, MICHIGAN.

PROCESS OF EXTRACTING NUCLEIN FROM YEAST.

SPECIFICATION forming part of Letters Patent No. 637,353, dated November 21, 1899.

Application filed May 2, 1898. Serial No. 679,487. (No specimens.)

*To all whom it may concern:*

Be it known that I, KARL SCHWICKERATH, a subject of the King of Prussia, German Emperor, residing at Detroit, county of Wayne, State of Michigan, have invented a certain new and useful Improvement in Processes of Extracting Nuclein from Yeast; and I declare the following to be a full, clear, and exact description of the invention, such as will enable others skilled in the art to which it pertains to make and use the same.

My invention relates to and has for its object the economical extraction of pure nuclein from yeast, a substance in which it is found in comparatively large quantities; and it consists in the method hereinafter described and claimed.

Heretofore the separation and production of pure nuclein from yeast have been quite difficult, especially in consequence of the coexistence of a slimy or gummy-like substance in the yeast, which adheres to the nuclein after its separation. I have succeeded in overcoming this difficulty in a simple manner, which consists, essentially, in its oxidation in a neutral or faintly-alkaline solution of the slimy substance, whereby it is so changed that it combines with a resultant base to form an insoluble compound which is easily separated by filtration, while from the filtrate the pure nuclein is precipitated.

In order to carry out the process thus outlined, I take, say, one hundred pounds of ordinary brewers' yeast and add sufficient hot water to reduce the mixture to a thin watery liquid. To this is gradually added concentrated caustic-soda solution until the resultant mixture is distinctly alkaline or will contain about one-eight of one per cent. free caustic soda. This is allowed to stand, with frequent stirring, for from one-half to one hour, when it is heated on a steam-bath from 40° to 50° centigrade. It is then neutralized with acetic acid, the addition of the acid being continued until a distinct acid reaction will be shown. The resultant mixture is then heated to about 70° centigrade and filtered. To the filtrate I add twice its volume of alcohol and a sufficient quantity of muriatic acid until the nuclein begins to be deposited in distinct flakes. The thus-separated crude nuclein is in flocculent brownish-yellow mass, which is washed with alcohol by decantation until the latter no longer takes up coloring-matter. Thereupon the separated nuclein is pressed and dried. This results in crude nuclein, still containing a large proportion of the slimy matter adverted to, and this is separated by the following process: One pound of the crude nuclein is macerated with fifteen pounds of water and about one-half ounce of caustic soda, with frequent stirring, for from six to ten hours and the turbid liquid obtained neutralized by dilute nitric acid. To this, with agitation, as by stirring, three to five ounces (or *quantum sufficit*) of a five per cent. potassium permanganate solution is added, and after standing for one hour is heated until the finely-divided insoluble manganese compound in the liquid begins to separate in flakes. The mass is then filtered, and by the addition of two or three times its volume of alcohol and a little muriatic acid to the filtrate the nuclein precipitates and can be separated in a pure state. It is then washed with alcohol, pressed, and finally dried *in vacuo*, when it becomes a fine powder, dry and light, of a white or cream-white color.

It is obvious that the yeast will vary somewhat, as it is derived from different sources, in consistency, degree of acidity, &c., within certain limits, and hence the exact proportions of all elements used cannot be given, nor can the exact length of time for manipulating be stated; but I have given it exact enough, so that any one skilled in chemistry can readily and with little variation practice my invention; and I therefore do not desire to confine myself to exact proportions or set length of time in my claim.

What I claim is—

The herein-described process of manufacturing nuclein, consisting substantially in—first, the extraction of impure nuclein from yeast or other analogous substances; second, macerating the impure nuclein in water with a dilute caustic alkaline solution, and neutralizing the resultant mass with appropriate acid; third, treating the resultant with a solution of potassium permanganate, substantially in the manner specified; and, fourth, adding to the filtrate obtained from the foregoing, acidulated alcohol to precipitate the nuclein, substantially as described.

In testimony whereof I sign this specification in the presence of two witnesses.

KARL SCHWICKERATH.

Witnesses:
R. A. PARKER,
MARION A. REEVE.